3,051,727
2,5-DIHYDRO-1,2,4-BENZOTHIADIAZEPINE-
1,1-DIOXIDE
Uberto Teotino and Giorgio Cignarella, Milan, Italy,
assignors to Lepetit S.p.A., Milan, Italy
No Drawing. Filed Dec. 5, 1960, Ser. No. 73,526
Claims priority, application Italy Dec. 9, 1959
2 Claims. (Cl. 260—327)

This invention is concerned with a new heterocyclic compound and a process for preparing the same. More particularly, the compound with which the invention is concerned is 2,5-dihydro-1,2,4-benzothiadiazepine 1,1-dioxide of the formula

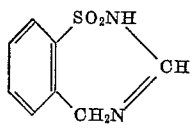

The new compound has been found highly effective as a diuretic agent.

The process for preparing 2,5-dihydro-1,2,4-benzothiadiazepine 1,1-dioxide comprises bubbling chlorine into a suspension of dithiosalicylamide in dilute hydrochloric acid to complete solution, neutralizing with an alkali carbonate or hydroxide, evaporating the mixture to dryness, extracting the residue with hot absolute ethanol, cooling, collecting the precipitated sodium o-cyanobenzenesulfonate, refluxing the same with phosphorous oxychloride, pouring the mixture in water, collecting the formed o-cyanobenzenesulfonyl chloride and dissolving it in diethyl ether, bubbling ammonia into the solution, collecting the precipitate, washing it with water, hydrogenating the formed o-cyanobenzenesulfonamide in the presence of palladium, and heating the formed o-aminomethylbenzenesulfonamide with ethyl orthoformate while continuously distilling off the formed ethyl alcohol.

The chemical reactions involved in the process are best illustrated by the following scheme.

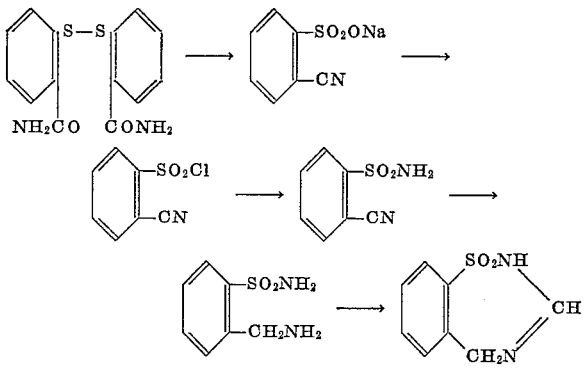

The following example is illustrative of the invention.

EXAMPLE o-Cyanobenzenesulfonic Acid (Na Salt)

A stream of chlorine was bubbled into a suspension of 30 g. of dithiosalicylamide in 900 ml. of hydrochloric acid (1:1) with stirring at room temperature. In 1–1.5 hours solution was complete and the evolution of heat had subsided. After air had been bubbled through to remove the excess chlorine, the solution was neutralized with a saturated sodium carbonate solution and evaporated to dryness in vacuo. The residue was dissolved in hot absolute ethanol. Sodium o-cyanobenzene sulfonate separated as white needles. Yield 28.6 g.

o-Cyanobenzenesulfonyl Chloride

Sodium o-cyanobenzenesulfonate (10 g.) was refluxed with 25 ml. of phosphorus oxychloride for 2 hours. The reaction mixture was poured into 50 ml. of ice-water and o-cyanobenzenesulfonyl chloride separated as colorless oil which crystallized rapidly on rubbing. The product was collected and dried. Yield 8.5 g. (86.5%), M.P. 69–69.5° C.

o-Cyanobenzenesulfonyl Chloride

A slow stream of gaseous ammonia was passed into a solution of 8 g. of o-cyanobenzenesulfonyl chloride in 50 ml. of anhydrous ether. The resulting white precipitate was collected immediately and treated with 10 ml. of water to remove the ammonium chloride. The residual o-cyanobenzenesulfonamide was dried in vacuo. Yield 5.4 g., M.P. 163–165° C.

o-Aminomethylbenzenesulfonamide

A solution containing 6g. of a o-cyanobenzenesulfonamide in 300 ml. of absolute alcohol was shaken for several hours with 1 g. of palladium on charcoal. After filtration, 500 ml. of 4% hydrochloric acid in absolute alcohol was added to the filtrate and the solution hydrogenated at room pressure and temperature in the presence of 2 g. of 10% palladium on charcoal. The reduction was complete in 5–6 hours. Then the catalyst was filtered and the solution evaporated to a small volume from which the amine hydrochloride separated as white needles; yield 3.6 g., M.P. 210–212°.

To prepare the free base a suspension of the hydrochloride in alcohol was treated with the theoretical amount of a 2% alcoholic solution of sodium ethoxide. The separated sodium chloride was filtered and the solution evaporated to dryness in vacuo; M.P. 114–115° C.

2,5-Dihydro-1,2,4-Benzothiadiazepine-1,1-Dioxide 2.4 g. of o-aminomethylbenzenesulfonamide was dissolved in 8 ml. of propylene glycol with mild heating. Then 8 ml. of ethyl orthoformate was added and the solution heated for 6 hours at 120–130° C. The ethanol formed in the reaction distilled over. The 2,5-dihydro-1,2,4-benzothiadiazepine-1,1-dioxide, which crystallized when the solution was cooled with ice, was filtered in vacuo and recrystallized from 60 ml. of methanol; yield 1.3 g. (51.5%), M.P. 240–241°.

We claim:

1. 2,5-dihydro-1,2,4-benzothiadiazepine 1,1-dioxide of the formula:

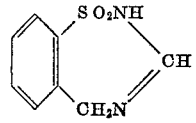

2. A process for preparing a compound of the formula:

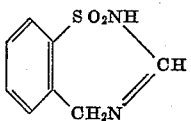

which comprises bubbling chlorine into a suspension of dithiosalicylamide in dilute hydrochloric acid to complete solution, neutralizing with a member of the group consisting of alkali metal carbonates and hydroxides, evaporating the mixture to dryness, extracting the residue with hot absolute ethanol, cooling, collecting the precipitated sodium o-cyanobenzenesulfonate, refluxing the same with phosphorous oxychloride, pouring the mixture in water, collecting the formed o-cyanobenzenesulfonyl chloride and dissolving it in diethyl ether, bubbling ammonia into the solution, collecting the precipitate, washing it with water, hydrogenating the formed o-cyanobenzenesulfonamide in the presence of palladium, and heating the formed o-aminomethylbenzenesulfonamide with ethyl orthoformate while continuously distilling off the formed ethyl alcohol.

References Cited in the file of this patent

Richter: Organic Chemistry, vol. 4, pages 4–8 (1947).
Parke et al.: Jour. Chem. Soc. (London), 1950, pages 1760–63.